(12) United States Patent
Matsuoka

(10) Patent No.: US 8,200,298 B2
(45) Date of Patent: Jun. 12, 2012

(54) KEYPAD HOUSING CONFIGURATION FOR A MOBILE COMPUTING DEVICE

(75) Inventor: Yoshimichi Matsuoka, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 899 days.

(21) Appl. No.: 12/128,593

(22) Filed: May 28, 2008

(65) Prior Publication Data

US 2009/0174666 A1    Jul. 9, 2009

Related U.S. Application Data

(63) Continuation-in-part of application No. 11/971,136, filed on Jan. 8, 2008.

(51) Int. Cl.
*H04M 1/00* (2006.01)
(52) U.S. Cl. .......... 455/575.4; 455/575.3; 361/680
(58) Field of Classification Search .......... 455/575.4, 455/575.3; 361/680, 684, 686
See application file for complete search history.

(56) References Cited

U.S. PATENT DOCUMENTS

| | | |
|---|---|---|
| 4,279,021 A | 7/1981 | See et al. |
| 4,415,065 A | 11/1983 | Sandstedt |
| 4,587,630 A | 5/1986 | Straton et al. |
| 4,725,694 A | 2/1988 | Auer et al. |
| 4,764,770 A | 8/1988 | Church |
| 4,803,474 A | 2/1989 | Kulp |
| 4,887,212 A | 12/1989 | Zamora et al. |
| 4,892,981 A | 1/1990 | Soloway et al. |
| 4,896,003 A | 1/1990 | Hsieh |
| 4,916,441 A | 4/1990 | Gombrich |
| 4,931,781 A | 6/1990 | Miyakawa |
| 5,010,547 A | 4/1991 | Johnson et al. |
| 5,012,219 A | 4/1991 | Henry |
| D320,598 S | 10/1991 | Auerbach et al. |
| 5,067,164 A | 11/1991 | Denker et al. |
| 5,075,684 A | 12/1991 | DeLuca |
| 5,101,439 A | 3/1992 | Kiang |
| 5,109,539 A | 4/1992 | Inubushi et al. |
| D326,451 S | 5/1992 | Roegner |
| 5,218,188 A | 6/1993 | Hanson |
| 5,227,614 A | 7/1993 | Danielson et al. |
| 5,235,561 A | 8/1993 | Seagner |
| 5,307,086 A | 4/1994 | Griffin et al. |
| 5,334,824 A | 8/1994 | Martinez |

(Continued)

FOREIGN PATENT DOCUMENTS

EP    0149762    7/1986

(Continued)

OTHER PUBLICATIONS

"3GPP2 Multimedia Messaging System—MMS Specification Overview—Revision: A. Mobile Messaging", May 2003, [online] [Retrieved on Dec. 10, 2004] Retrieved from the Internet: URL: http://www.lebodic.net/left.htm.

(Continued)

*Primary Examiner* — Phuoc Doan

(57) ABSTRACT

A mobile computing device includes a housing, a keypad assembly, and a housing lip. The keypad assembly provides a plurality of keys on a façade of the housing. The keypad and the plurality of keys are dimensioned to be operable with one or both of a user's thumbs. A housing lip that protrudes from the façade of the housing so as to at least partially circumvent the plurality of keys.

19 Claims, 9 Drawing Sheets

U.S. PATENT DOCUMENTS

| | | |
|---|---|---|
| 5,335,276 A | 8/1994 | Thompson et al. |
| 5,336,001 A | 8/1994 | Litchenberg |
| 5,345,615 A | 9/1994 | Garofalo |
| 5,357,065 A | 10/1994 | Mitamura et al. |
| 5,359,317 A | 10/1994 | Gomez et al. |
| 5,379,057 A | 1/1995 | Clough et al. |
| 5,381,387 A | 1/1995 | Blonder et al. |
| 5,392,447 A | 2/1995 | Schlack et al. |
| 5,394,140 A | 2/1995 | Wong et al. |
| 5,398,310 A | 3/1995 | Tchao et al. |
| D359,920 S | 7/1995 | Sakamoto |
| 5,440,629 A | 8/1995 | Gray |
| 5,442,406 A | 8/1995 | Altmanshofer et al. |
| 5,450,619 A | 9/1995 | Maeda |
| 5,465,401 A | 11/1995 | Thompson |
| 5,494,363 A | 2/1996 | Hochgesang |
| 5,502,460 A | 3/1996 | Bowen |
| 5,503,484 A | 4/1996 | Louis |
| 5,510,808 A | 4/1996 | Cina |
| 5,563,629 A | 10/1996 | Caprara |
| 5,584,054 A | 12/1996 | Tyneski et al. |
| 5,612,682 A | 3/1997 | DeLuca et al. |
| 5,619,555 A | 4/1997 | Fenton et al. |
| 5,627,978 A | 5/1997 | Altom et al. |
| 5,644,338 A | 7/1997 | Bowen |
| 5,646,402 A | 7/1997 | Khovaylo et al. |
| 5,650,776 A | 7/1997 | Mitchell et al. |
| 5,661,641 A | 8/1997 | Shindo |
| 5,705,995 A | 1/1998 | Laflin et al. |
| 5,719,936 A | 2/1998 | Hillenmayer |
| 5,742,894 A | 4/1998 | Jambhekar et al. |
| 5,745,904 A | 4/1998 | King et al. |
| 5,754,636 A | 5/1998 | Bayless et al. |
| 5,779,030 A | 7/1998 | Ikegami et al. |
| 5,797,029 A | 8/1998 | Nguyen et al. |
| 5,797,089 A | 8/1998 | Nguyen |
| 5,797,098 A | 8/1998 | Schroeder et al. |
| 5,809,115 A | 9/1998 | Inkinen |
| 5,812,651 A | 9/1998 | Kaplan |
| 5,813,778 A | 9/1998 | Shi |
| 5,815,142 A | 9/1998 | Ailard et al. |
| 5,821,881 A | 10/1998 | Fischer et al. |
| D401,577 S | 11/1998 | Yamaguchi |
| 5,848,356 A | 12/1998 | Jambhekar et al. |
| 5,860,074 A | 1/1999 | Rowe et al. |
| 5,873,108 A | 2/1999 | Goyal et al. |
| 5,889,600 A | 3/1999 | McGuire |
| 5,903,852 A | 5/1999 | Schaupp et al. |
| 5,917,905 A | 6/1999 | Whipple et al. |
| 5,917,906 A | 6/1999 | Thornton |
| 5,922,071 A | 7/1999 | Taylor et al. |
| 5,941,648 A | 8/1999 | Robinson et al. |
| 5,949,764 A | 9/1999 | Yoshida et al. |
| 5,958,006 A | 9/1999 | Eggleston et al. |
| 5,974,334 A | 10/1999 | Jones |
| D416,256 S | 11/1999 | Griffin et al. |
| 6,002,944 A | 12/1999 | Beyda |
| 6,006,109 A | 12/1999 | Shin |
| 6,009,338 A | 12/1999 | Iwata et al. |
| 6,016,142 A | 1/2000 | Chang et al. |
| 6,018,571 A | 1/2000 | Langlois et al. |
| 6,029,072 A | 2/2000 | Barber |
| 6,035,214 A | 3/2000 | Henderson |
| 6,055,439 A | 4/2000 | Helin et al. |
| 6,058,304 A | 5/2000 | Callaghan et al. |
| 6,064,734 A | 5/2000 | Hasegawa et al. |
| 6,069,648 A | 5/2000 | Suso et al. |
| 6,073,027 A | 6/2000 | Norman et al. |
| 6,084,951 A | 7/2000 | Smith et al. |
| 6,097,391 A | 8/2000 | Wilcox |
| 6,101,531 A | 8/2000 | Egglestorl et al. |
| 6,111,527 A | 8/2000 | Susel |
| 6,115,248 A | 9/2000 | Canova et al. |
| 6,119,179 A | 9/2000 | Whitridge |
| 6,128,475 A | 10/2000 | Wicks et al. |
| 6,133,916 A | 10/2000 | Bukszaar et al. |
| 6,137,469 A | 10/2000 | Wu et al. |
| 6,157,630 A | 12/2000 | Adler et al. |
| 6,166,342 A | 12/2000 | Chou |
| 6,169,911 B1 | 1/2001 | Wagner et al. |
| 6,188,917 B1 | 2/2001 | Laureanti |
| 6,192,118 B1 | 2/2001 | Bayless et al. |
| 6,198,053 B1 | 3/2001 | Chou |
| 6,208,879 B1 | 3/2001 | Iwata et al. |
| 6,215,865 B1 | 4/2001 | McCalmont |
| 6,233,469 B1 | 5/2001 | Watanabe |
| 6,243,452 B1 | 6/2001 | O'Shaughnessey et al. |
| 6,243,595 B1 | 6/2001 | Lee et al. |
| 6,256,631 B1 | 7/2001 | Malcolm |
| 6,259,449 B1 | 7/2001 | Saxena et al. |
| 6,259,932 B1 | 7/2001 | Constein |
| 6,262,716 B1 | 7/2001 | Raasch |
| 6,278,884 B1 | 8/2001 | Kim |
| 6,295,372 B1 | 9/2001 | Hawkins et al. |
| 6,297,795 B1 | 10/2001 | Kato et al. |
| 6,297,945 B1 | 10/2001 | Yamamoto |
| 6,310,609 B1 | 10/2001 | Morgenthater |
| 6,317,313 B1 | 11/2001 | Mosgrove et al. |
| 6,317,781 B1 | 11/2001 | DeBoor et al. |
| 6,333,973 B1 | 12/2001 | Smith et al. |
| D454,349 S | 3/2002 | Makidera et al. |
| 6,370,018 B1 | 4/2002 | Miller et al. |
| D456,794 S | 5/2002 | Laverick et al. |
| 6,389,124 B1 | 5/2002 | Schnarel et al. |
| 6,397,084 B1 | 5/2002 | Wicks et al. |
| 6,405,172 B1 | 6/2002 | Baker et al. |
| 6,415,138 B2 | 7/2002 | Sirola et al. |
| 6,424,369 B1 | 7/2002 | Adair et al. |
| 6,442,263 B1 | 8/2002 | Beaton et al. |
| D462,354 S | 9/2002 | Kimbre et al. |
| 6,445,577 B1 | 9/2002 | Madsen et al. |
| 6,452,588 B2 | 9/2002 | Griffin et al. |
| D464,962 S | 10/2002 | MacGregor et al. |
| 6,462,941 B1 | 10/2002 | Hulick et al. |
| 6,466,202 B1 | 10/2002 | Suso et al. |
| 6,469,910 B2 | 10/2002 | Lefort |
| 6,483,445 B1 | 11/2002 | England |
| 6,483,697 B1 | 11/2002 | Jenks et al. |
| 6,502,090 B1 | 12/2002 | Raisanen |
| D468,714 S | 1/2003 | Maruska et al. |
| 6,512,507 B1 | 1/2003 | Furihata et al. |
| D470,842 S | 2/2003 | Bhatia et al. |
| 6,516,202 B1 | 2/2003 | Hawkins et al. |
| 6,525,715 B2 | 2/2003 | Uchiyama |
| D471,559 S | 3/2003 | DeSaulles |
| 6,535,749 B1 | 3/2003 | Iwata et al. |
| D473,580 S | 4/2003 | Nakahara |
| 6,542,721 B2 | 4/2003 | Boesen |
| 6,549,194 B1 | 4/2003 | McIntyre et al. |
| 6,557,004 B1 | 4/2003 | Ben-Shachar et al. |
| 6,577,721 B1 | 6/2003 | Vainio et al. |
| 6,577,877 B1 | 6/2003 | Charlier et al. |
| 6,583,806 B2 | 6/2003 | Ludwig et al. |
| D477,114 S | 7/2003 | Sheng |
| D477,597 S | 7/2003 | Laverick et al. |
| 6,587,700 B1 | 7/2003 | Meins et al. |
| 6,636,203 B1 | 10/2003 | Wong et al. |
| 6,636,419 B2 | 10/2003 | Duarte |
| 6,640,114 B2 | 10/2003 | Bae |
| 6,643,124 B2 | 11/2003 | Wilk |
| 6,643,529 B1 | 11/2003 | Inoue et al. |
| 6,658,272 B1 | 12/2003 | Lenchik et al. |
| 6,661,404 B1 | 12/2003 | Sirola et al. |
| 6,665,173 B2 | 12/2003 | Brandenberg et al. |
| D488,478 S | 4/2004 | Laverick et al. |
| D490,100 S | 5/2004 | Su et al. |
| 6,748,249 B1 | 6/2004 | Eromaki et al. |
| 6,751,473 B1 | 6/2004 | Goyal et al. |
| D494,166 S | 8/2004 | Kumagai et al. |
| 6,771,992 B1 | 8/2004 | Tomura et al. |
| 6,781,575 B1 | 8/2004 | Hawkins et al. |
| 6,792,090 B1 | 9/2004 | Kobayashi |
| 6,882,326 B2 | 4/2005 | Hirayama et al. |
| 6,898,301 B2 | 5/2005 | Iwanaga |
| 6,947,158 B1 | 9/2005 | Kitamura et al. |
| D511,342 S | 11/2005 | Chien |
| 6,961,593 B1 | 11/2005 | Lonka et al. |

| | | |
|---|---|---|
| 6,973,217 B2 | 12/2005 | Bolick et al. |
| 6,976,217 B1 | 12/2005 | Vertaschitsch |
| 7,007,239 B1 | 2/2006 | Hawkins et al. |
| 7,016,182 B2 | 3/2006 | Brandenberg et al. |
| 7,058,168 B1 | 6/2006 | Knappe et al. |
| 7,069,056 B2 | 6/2006 | Iwata et al. |
| 7,069,063 B2 | 6/2006 | Halkosaari et al. |
| 7,092,747 B2 | 8/2006 | Park et al. |
| 7,155,419 B2 | 12/2006 | Blackman et al. |
| D535,281 S | 1/2007 | Yang |
| 7,181,256 B2 | 2/2007 | Hyun et al. |
| 7,187,363 B2 | 3/2007 | Nguyen et al. |
| 7,231,208 B2 | 6/2007 | Robertson et al. |
| D546,313 S | 7/2007 | Lheem |
| 7,269,450 B2 | 9/2007 | Lee et al. |
| D558,757 S | 1/2008 | Andre et al. |
| D561,159 S | 2/2008 | Heng et al. |
| D561,782 S | 2/2008 | Kim |
| D562,289 S | 2/2008 | Suk et al. |
| D563,935 S | 3/2008 | Kim et al. |
| D568,284 S | 5/2008 | Lee et al. |
| D575,259 S | 8/2008 | Kim et al. |
| 7,412,258 B1 | 8/2008 | Lipponen et al. |
| D581,390 S | 11/2008 | Ma et al. |
| D585,044 S | 1/2009 | Seo et al. |
| 7,474,298 B2 | 1/2009 | Nguyen et al. |
| D588,594 S | 3/2009 | Matsuoka |
| D590,804 S | 4/2009 | Tkachuk |
| D591,739 S | 5/2009 | Matsuoka |
| D592,628 S | 5/2009 | Kim et al. |
| D593,062 S | 5/2009 | Lee et al. |
| D594,433 S | 6/2009 | Seo et al. |
| D596,152 S | 7/2009 | Hong et al. |
| 7,561,421 B2 * | 7/2009 | Rehn et al. ............... 361/679.09 |
| D597,507 S | 8/2009 | Jung et al. |
| D600,230 S | 9/2009 | Salmi et al. |
| D600,241 S | 9/2009 | Andre et al. |
| D600,667 S | 9/2009 | Hu et al. |
| D601,993 S | 10/2009 | Yun et al. |
| D602,014 S | 10/2009 | Andre et al. |
| D602,017 S | 10/2009 | Andre et al. |
| D602,455 S | 10/2009 | Lee et al. |
| D602,903 S | 10/2009 | Tompkin et al. |
| D603,830 S | 11/2009 | Webb et al. |
| D606,037 S | 12/2009 | Christopher et al. |
| D606,960 S | 12/2009 | Ahn et al. |
| 7,636,592 B2 | 12/2009 | Kim et al. |
| D608,228 S | 1/2010 | Miyawaki |
| 2001/0011993 A1 | 8/2001 | Saarinen |
| 2001/0034222 A1 | 10/2001 | Roustaei et al. |
| 2001/0046886 A1 | 11/2001 | Ishigaki |
| 2002/0041361 A1 | 4/2002 | Tiao et al. |
| 2002/0042853 A1 | 4/2002 | Santoh et al. |
| 2002/0044136 A1 | 4/2002 | Griffin et al. |
| 2002/0044216 A1 | 4/2002 | Cha |
| 2002/0082043 A1 | 6/2002 | Wilska et al. |
| 2002/0115478 A1 | 8/2002 | Fujisawa et al. |
| 2002/0133378 A1 | 9/2002 | Mault et al. |
| 2002/0140667 A1 | 10/2002 | Horiki |
| 2002/0154745 A1 | 10/2002 | Shtivelman |
| 2002/0169924 A1 | 11/2002 | Osborn |
| 2002/0191160 A1 | 12/2002 | Chuang |
| 2003/0008679 A1 | 1/2003 | Iwata et al. |
| 2003/0034987 A1 | 2/2003 | Webb et al. |
| 2003/0064751 A1 | 4/2003 | Charlier et al. |
| 2003/0071791 A1 | 4/2003 | Hanson |
| 2003/0073414 A1 | 4/2003 | Capps |
| 2003/0090468 A1 | 5/2003 | Finke-Anlauff |
| 2003/0112225 A1 | 6/2003 | Grandberg |
| 2003/0122779 A1 | 7/2003 | Martin et al. |
| 2003/0122882 A1 | 7/2003 | Kho |
| 2003/0128190 A1 | 7/2003 | Wilbrink et al. |
| 2003/0137493 A1 | 7/2003 | Chuang |
| 2003/0228863 A1 | 12/2003 | Vander Veen et al. |
| 2003/0228888 A1 | 12/2003 | Adamson |
| 2004/0008827 A1 | 1/2004 | Martin et al. |
| 2004/0023643 A1 | 2/2004 | Vander Veen et al. |
| 2004/0026136 A1 | 2/2004 | Hill et al. |
| 2004/0028192 A1 | 2/2004 | Pelletier |
| 2004/0028199 A1 | 2/2004 | Carlson |
| 2004/0039794 A1 | 2/2004 | Biby et al. |
| 2004/0062367 A1 | 4/2004 | Fellerstein et al. |
| 2004/0155909 A1 | 8/2004 | Wagner |
| 2004/0157653 A1 | 8/2004 | Kato |
| 2004/0203977 A1 | 10/2004 | Kennedy |
| 2004/0240163 A1 | 12/2004 | Adams et al. |
| 2005/0267975 A1 | 12/2005 | Qureshi et al. |
| 2006/0015819 A1 | 1/2006 | Hawkins et al. |
| 2006/0036648 A1 | 2/2006 | Yao et al. |
| 2006/0063571 A1 * | 3/2006 | Chadha ...................... 455/575.3 |
| 2006/0121938 A1 | 6/2006 | Haitani et al. |
| 2006/0160566 A1 | 7/2006 | Plahte et al. |
| 2006/0161858 A1 | 7/2006 | Hawkins et al. |
| 2006/0168539 A1 | 7/2006 | Hawkins et al. |
| 2006/0281501 A1 | 12/2006 | Zuo et al. |
| 2007/0142101 A1 * | 6/2007 | Seshagiri et al. .......... 455/575.4 |
| 2007/0146330 A1 | 6/2007 | Nguyen |
| 2007/0155427 A1 | 7/2007 | Tran |
| 2007/0291052 A1 | 12/2007 | van der Meulen |
| 2008/0024453 A1 | 1/2008 | Webb et al. |
| 2009/0034172 A1 | 2/2009 | Nguyen et al. |
| 2009/0147471 A1 | 6/2009 | Francisco et al. |
| 2009/0174666 A1 | 7/2009 | Matsuoka |
| 2009/0186662 A1 | 7/2009 | Rak et al. |
| 2009/0305742 A1 | 12/2009 | Caballero et al. |

FOREIGN PATENT DOCUMENTS

| | | |
|---|---|---|
| EP | 0704788 | 4/1996 |
| EP | 1051012 | 11/2000 |
| EP | 1107101 | 6/2001 |
| EP | 1220517 | 7/2002 |
| FR | 2760933 | 9/1998 |
| GB | 2289595 | 11/1995 |
| JP | 2001024762 | 1/2001 |
| KR | 10-2002-14107 A | 2/2002 |
| KR | 10-2003-90549 A | 11/2003 |
| KR | 20-0355890 Y1 | 7/2004 |
| KR | 20-0384472 Y1 | 5/2005 |
| KR | 20-0389749 Y1 | 7/2005 |
| WO | WO99/08238 | 2/1999 |
| WO | WO01/13605 | 2/2001 |

OTHER PUBLICATIONS

"An Introduction to Mobile Messaging," Mobile Messaging, May 2003, [online] [Retrieved on Dec. 10, 2004] Retrieved from the Internet: URL: http://www.lebodic.netlintro.htm.

"At Last, Technology Harnesse [sic] One of the Most Powerf [sic] Forces know to Men.", GO Corporation, 14 pages, Foster City, (1991).

"AT&T New Release, NCR Cuts Price of 3170 Notebook Computer 11 to 19 Percent", 2 pages [online], retrieved from the Internet: URL: http://www.att.com/press/0393/930308.nca.html., (Mar. 8, 1993).

"Definition of Handheld Computer", printed from thte website: http://dictionary.reference.com, dated Feb. 11, 2004 (3 pgs).

"Definition of Handheld", printed from thte website: http://searchmobilecomputing.techtarget.com, dated Feb. 11, 2004 (3 pgs).

"Excerpts from Ericsson Mobile Phone 1888 World User's Guide", Copyright 1998 Ericsson Mobile Communications AB.

"Handheld" Game Console—Wikipedia, the free encyclopedia, [online] [Retrieved on Oct. 13, 2006], Retrieved from the Internet: URL: http://en.wikipedia.org/wjkwHandheld_game_console.

"IBM Selects Racotek Data/Voice Communications Services to Interface with Touchmobile Product", PR Newswire, Jan. 26, 1993, 2 pages.

"IBM Touchmobile Information and Planning Guide", International Business Machines Incorporated, Mar. 1993, 20 pages.

"IBM TouchMobile Solution for Data Capture and Communication, Keeping Your Business Moving in the 90's, International Business Machines Incorporated, Jan. 1993, 13 pages."

"IBM's Touchmobile Helps Field Workers Collect Data at the Touch of a Finger", PR Newswire, Jan. 26, 1993 , 1 page.

"Nokia, Frequently Asked Questions", http://www.nokia.com.in/nokiaapac/india/faqs_list/0,18778,39_41,00.html. Nov. 17, 2003.

"PCT Notification of Transmittal of International Preliminary Examination Report", PCT/US2000/22182, (Oct. 26, 2001), 6 pages.

"Printout of various website pages from biz.yahoo.com article"Conference Calling Added to BestNet's Service Designed for Palm OS(R) Handhelds"—Tuesday, Aug. 21, 2001".

"The Handheld Computing Industry—2000", Stanford Technology Ventures Program (STVP), (Jan. 13, 2001), pp. 1-38.

Agrawal, P. et al., "Get Wireless: A Mobile Technology Spectrum", IT PRO, IEEE, (Jul./Aug. 1999), 18-23.

American Programmer, American Programmer, Inc., NY, (Dec. 1991), 4-33.

Caar, R.M. "The Point of the Pen". Byte, Reprinted, Feb. 1991, 10 pages.

Chan, E. et al., "Personal Digital Assistants & Wireless Convergence", MGMT 557 Strategic Management of Innovation, (May 4, 2000), 1-28.

Communication pursuant to Article 96(2) EPC, European Patent Office, Application No. 02 766 017.4-1527, Aug. 2, 2007, 8 pages.

Communications Solutions™ TMC Labs Test Drive, Mar. 2000, Retrieved from the Internet: URL: https://www.tmcnet.com/articles/comsol/0300/0300labs1.htm.

Cowart, T.,Mastering Windows 95—The Windows 95 Bible, (1995), 110-117, 352-359, SyBex, USA.

Cullen, A. "Connecting with Your EO Cellular Module", EO, Inc. Mountain View., (1992, 1993), ii-33.

Cullen, A. "Getting Started with Your EO Personal Communicator", EO, Inc. Mountain View., (1992, 1993), ii-74.

Cullen, A. "Lookup Guide to the EO Personal Communicator", EO, Inc. Mountain View., (1992, 1993), ii-320.

Dyszel, B., "Handspring Visor for Dummies", IDG Books Worldwide, Inc, (2000), o. 13, 15, 121, 122, 123, 208.

Excerpts from Handspring VisorPhone™ User's Guide, Copyright 2000 Handspring, Inc.

Excerpts from Motorola Timeport Tri-Band Mobile Telephone Manual, Copyright 1999 Motorola, Inc.

Final Office Action mailed Mar. 13, 2006, for US 2003/0034987, 10 pages.

GO Corporation Information Statement, 218 pages, (Nov. 8, 1993).

Hewlet Packard, Products and Services, http://www.hp.com/, Nov. 11, 2001.

Ikeya, B. "Detailed Overview of the PC Card Standard, PCMCIA", http://www.pcmcia.org/pccarcJstandard.htm., (1998).

International Search Report and Written Opinion of the International Searching Authority in International Application PCT/US2002/26197, ISA/US, Dec. 13, 2002, 4pgs.

Introduction to PCMCIA Technical Tutorial, Dec. 6, 2002. pp. 1-11.

Kanellos, M. "Qualcomm Merges Phone, Handheld", CNET News.com, Sep. 21, 1998 http://www.news.com/Qualcomm+merges+phone%2C+handheld/2100-1001_3-215791.html.

MacNeill, D. "Messaging Card and NewtonMail: We Pick Up and Deliver", On The Go Magazine, http://www.pencomputing.com/Newton/NewtonNotes2.html, 2 pages.

MacNeill, D. "Wireless Newton Technology Goes to Work", On The Go Magazine, Oct. 13, 1993, http://www.pencomputing.com/Newton/NewtonNotes2.html, 2 pages.

Maki, K. "The AT&T EO Travel Guide", John Wiley & Sons, Inc., N.Y. 1993, iii-555.

Microsoft Microsoft Windows & MS_DOS User's Guide, (1993), p. 19, 26.

Microsoft® Windows Version 5.1, copyright 2001 (hereinafter "Windows") (screenshots 1-8).

Nokia Introduces Mobile Chat With Nokia 3310, http://www.mobiletechnews.com/info/2000/09/01/1_42022.htm, (Sep. 1, 2000).

Non-Final Office Action dated Apr. 27, 2009 in U.S. Appl. No. 09/932,213, 18 pgs.

Notification of Transmittal of International Search Report and Written Opinion, International Search Report, and Written Opinion mailed Jul. 27, 2009 in International Application No. PCT/US2008/086487, 14 pages.

PCT International Search Report, PCT/US2000/22182, (Jan. 10, 2001), 8 pages.

PCT International Search Report, Publication WO 01/13605 A3, (Feb. 22, 2001).

pdQ™ Basics Handbook, Qualcomm Incorporated., (1998, 1999), 96 pages.

Plumley, B., "Ten Minute Guide to Windows NT Workstation 4.O", Que, (Aug. 1996).

Powell, E. "Kyocera pdQ Smartphone—Brief Article—Product Announcement", http://www.findarticles.com/plartjdes/mjmOFAUTis917/ai65650619/print., (2000).

Printout of various website pages from www.bestnetcall.com regarding pdaCall (patent pending), printed Aug. 21, 2001.

Qualcomm pdQ™ 1900 Digital PCTS SmartPhone, Qualcomm Incorporated, (1999), 2 pages.

Schlender, B. R., "Hot New PCs That Read Your Writing", Fortune, Reprinted, (Feb. 11, 1991),6 pages.

Shah, R. "The Qualcomm pdQ: Kill Two Birds with One Phone", CNN.com, http://archives.cnn.com/i999rrECHJptechJi2/o3/qualcomm.pdq, (Dec. 3, 1999).

Stock, R. "The World of Messaging an Introduction to Personal Communications", EO, Inc., Mountain View, (1992, 1993), p. ii-69.

Supplemental European Search Report dated Apr. 24, 2007 in PCT/US02/26197, European Patent Office, 3 pages.

T-Mobile Products; Handhelds, http://www.tmobile.com, (Sep. 28, 2002), 2 pages.

T-Mobile Products; Sidekick, http://www.tmobile.com, (Sep. 28, 2002), 3 pages.

Toshiba Computer Systems Group, http://www.toshiba.com (May 28, 2002), 1 page.

Toshiba Computer Systems Group: Pocket PC e570 http://www.pda.toshiba.com (Jul. 7, 2001), 2 page.

U.S. Appl. No. 60/329,180, filed Oct. 15, 2001, Capps.

Final Office Action mailed Jun. 4, 2010 in U.S. Appl. No. 11/611,830.

* cited by examiner

KEYPAD HOUSING CONFIGURATION FOR A MOBILE COMPUTING DEVICE

RELATED APPLICATIONS

This application is a continuation-in-part of U.S. patent application Ser. No. 11/971,136, filed Jan. 8, 2008, entitled MOBILE COMPUTING DEVICE WITH MOVEABLE HOUSING SEGMENTS; the aforementioned priority application being hereby incorporated by reference.

TECHNICAL FIELD

The disclosed embodiments relate generally to the field of mobile computing devices. In particular, the disclosed embodiments pertain to a keypad housing configuration for a mobile computing device

BACKGROUND

Over the last several years, the growth of cell phones and messaging devices has increased the need for keypads and button/key sets that are small and tightly spaced. In particular, small form-factor keyboards, including QWERTY layouts, have become smaller and more tightly spaced. With decreasing overall size, there has been greater focus on efforts to provide functionality and input mechanisms more effectively on the housings.

In addition to a keyboard, mobile computing devices and other electronic devices typically incorporate numerous buttons to perform specific functions. These buttons may be dedicated to launching applications, short cuts, or special tasks such as answering or dropping phone calls. The configuration, orientation and positioning of such buttons is often a matter of concern, particularly when devices are smaller.

At the same time, there has been added focus to how displays are presented, particularly with the increase resolution and power made available under improved technology. Moreover, form factor consideration such as slimness and appearance are important in marketing a device.

DETAILED DESCRIPTION

Embodiments described herein provide a mobile computing device that includes housing features to facilitate use of a small form-factor keypad. In an embodiment, a housing of a mobile computing device includes surface features that support and facilitate the user's thumbs when using the keypad.

According to an embodiment, a mobile computing device includes a housing, a keypad assembly, and a housing lip that is positioned to provide a supportive housing surface for use of the keypad assembly. The keypad assembly provides a plurality of keys on a façade of the housing. The keypad and the plurality of keys are dimensioned to be operable with one or both of a user's thumbs. The housing lip that protrudes from the façade of the housing so as to at least partially circumvent the plurality of keys.

Among other advantages, a housing lip such as described with one or more embodiments provides a base to support a base of the user's thumbs as the user extends the tip of his thump over a keypad of the device. Still further, an embodiment provides the housing lip may be used to provide a place of reference (i.e. a tactile landmark) by which the user can tactilely locate the point from which he should extend his or her thumbs onto the thumb-size keyboard. Still further, one embodiment provides that the housing lip provides a thumbrest for the user when operating the keypad of a mobile computing device.

Perimeter Housing Lip Construction

Figure 1:
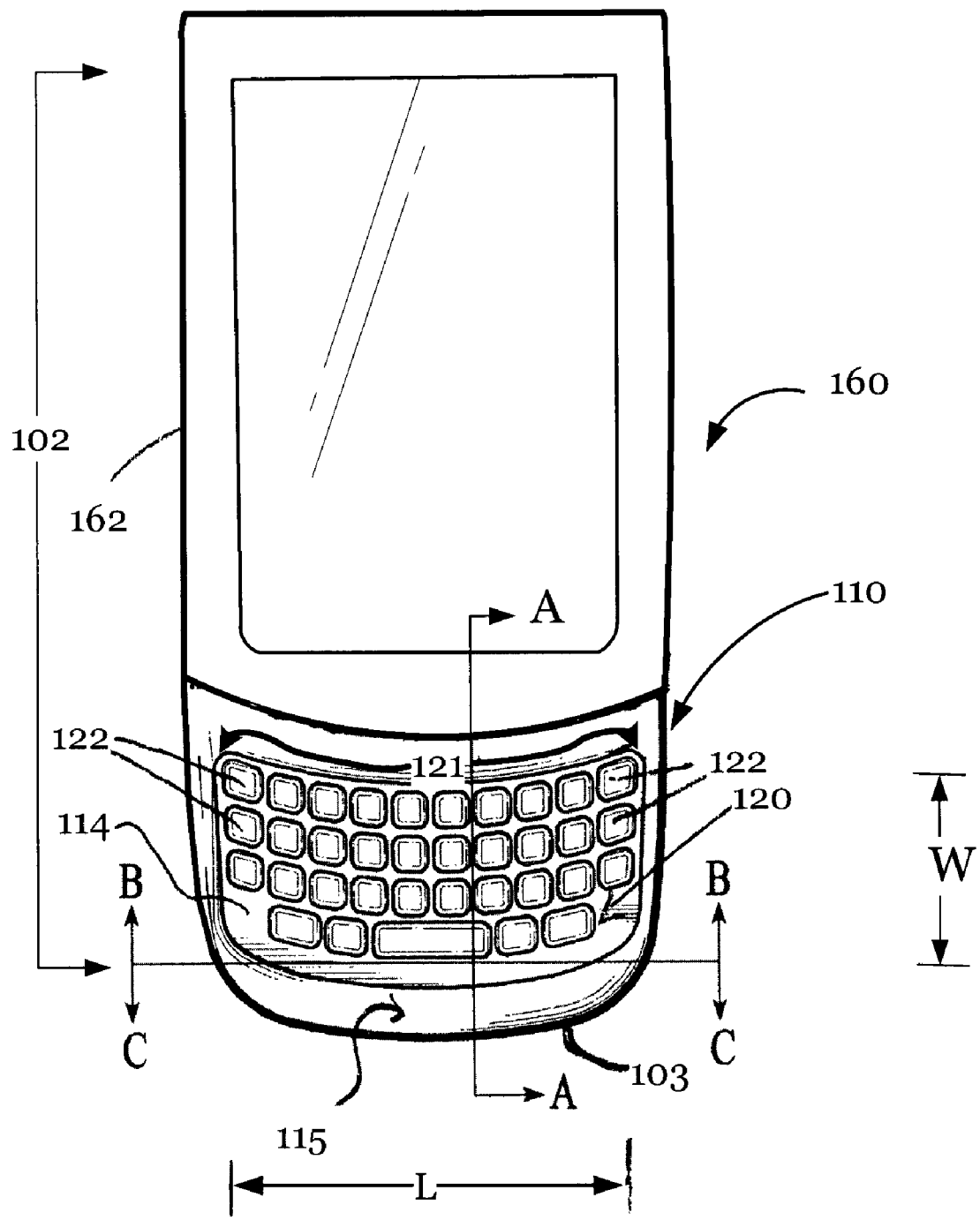
FIG. 1 illustrates a housing segment for a mobile computing device, configured in accordance with one or more embodiments of the invention.

FIG. 1 illustrates a housing segment for a mobile computing device, configured in accordance with one or more embodiments of the invention. A mobile computing device 100 of FIG. 1 may correspond to a cellular telephony/messaging device that accommodates character key inputs from the user to dial phone numbers or type, compose or address messages. The mobile computing device 100 includes a housing segment 110 on which a keypad 120 is provided. The mobile computing device 100 provides one portion or housing section of the overall housing 102 of the mobile computing device 100. The housing segment 110 has a perimeter lip construction 115, such as may be provided by a raised surface provided on a perimeter of the housing segment. According to an embodiment, the perimeter lip construction 115 circumvents some or all of the keypad 120.

The housing 102 of the mobile computing device 100 may have anyone of many possible housing types or constructions. As described with, for example, an embodiment of FIG. 3A thru FIG. 3B, the housing 102 may be of a slider-type housing construction. In such a construction, an embodiment provides that the housing segment 110 may form one of two or more housing segments that comprise the overall housing 102. Alternatively, as shown by an embodiment of FIG. 1, the housing 102 of the mobile computing device 100 may have a single-body construction, and the housing segment 110 may form one portion or section of the overall housing. Still further, the housing 102 of the mobile computing device 100 may have a 'flip' construction, in which the housing segment 110 pivots relative to another housing segment so as to move between an open and closed position.

According to an embodiment, the lip construction 115 provides a stop or rest surface for a user's thumbs, so as to facilitate use of the keypad. As an alternative or addition, the lip construction 115 may provide an iconic housing feature to distinguish the façade 114 on which the keypad is provided. Still further, with regard to an embodiment in which the mobile device 100 has a slider housing construction (e.g. see FIG. 3A thru FIG. 3B), the lip construction 115 may enable the keypad 120 to be relatively sunken within the façade 114 of a housing segment 110, so as to reduce gap separation between the housing segment 110 and the other housing segment when the two housing segments are moved between the open and closed positions. For example, the lip construction 115 may enable the keypad to be sunken so as to facilitate a tight sliding motion between the housing segment 110 of the keypad 120 in relation to a second housing segment 160 (e.g. one carrying a display 162).

In an embodiment, the mobile computing device 100 may correspond to, for example, a multi-function cellular or wireless computing device that incorporates cellular/wireless data and voice handling capabilities, to enable functions such as telephony, messaging and Internet browsing. In particular, the device 100 may correspond to a cellular telephony/data devices, capable of enabling voice/telephony communications, messaging services (e.g. email, Short Message Service (SMS), Multimedia Message Service (MMS), Instant Messaging) and/or other functionality such as media playback, Global Positioning System (GPS) functionality, wireless fidelity (WiFi) or Internet access, and image/video capture. As such, the device 100 may be relatively small and portable, such as in the form of a handheld device. Still further, embodiments contemplate the device to be ultra-small, such as finger-held size (i.e. held by ends of fingers, using two or three fingers), with features and functionality such as described (e.g. keyboard, cellular voice and messaging, display). Other forms of mobile computing devices may also be integrated or incorporated with embodiments described herein. For example, device 100 may include primary functions of serving as a Global Positioning System unit or a media player.

According to an embodiment, the housing segment 110 includes a perimeter edge 112 and a façade 114. The keypad 120 may occupy an area 121 of the façade 114. The keys 122 of the keypad 120 may extend from the façade 114. The area 121 may be substantially represented by length and width dimensions (L,W). In an embodiment, the keypad 120 may be a modular unit, so as to be provided substantially as one component in an assembly process where the device is assembled. For example, the keypad 120 may be provided as a modular multi-layer component, having a key structure layer laminated over an illumination later and electrical contact layer. The layers may be packaged as one assembly product and incorporated into the housing segment 110.

The perimeter of the housing segment 110 may include the lip construction 115 that circumvents at least a portion of the keypad area 121. The keypad area 121, alternatively referred to as the keypad's footprint, corresponds to a region that the collection of keys 122 that comprise the keypad occupy on the front façade 114. According to an embodiment, the lip construction 115 is provided just within or at the perimeter edge 121, so as to adopt the shape of the perimeter edge. For example, the end shape of the housing segment 110 may be tapered or rounded on ends, and the lip construction 115 may adopt the same shape. In an embodiment, the lip construction 115 circumvents the entire perimeter of the housing segment. Alternatively, the lip construction 115 borders at least the portion that includes or surrounds the keypad area 121. Still further, another embodiment may position the lip construction 115 at only the bottom end 103 of the housing segment, so as to extend only around the length dimension (L) of the keypad area 121. As another alternative, an embodiment provides that the lip construction 115 extends around the length dimension (L) and at least partly around the width dimension (W) of the keypad area 121.

Figure 2A:
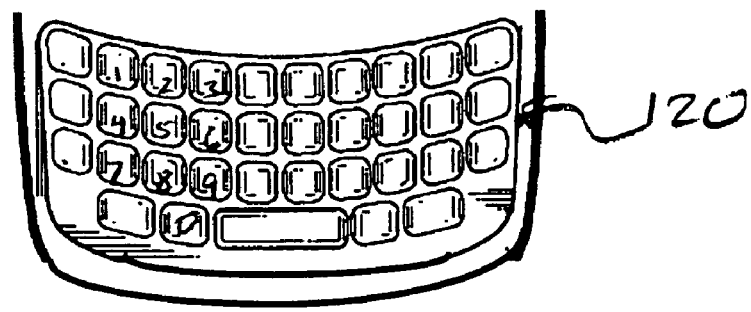
FIG. 2A and FIG. 2B illustrate different keypad configurations that may be implemented with keypad, under one or more embodiments.
Figure 2B:
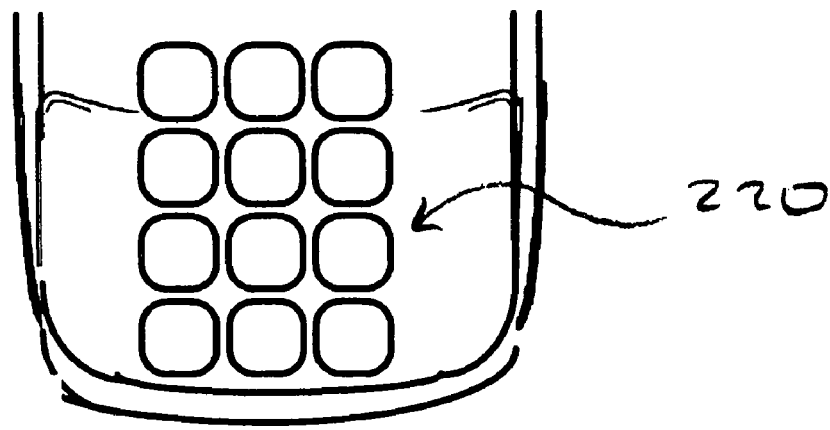

The keypad 120 may include keys 122 that enable text and numeric entry. FIG. 2A and FIG. 2B illustrate different keypad configurations that may be implemented with keypad 120, under one or more embodiments. In one implementation shown by FIG. 2A, keypad 120 has a QWERTY configuration. Optionally, some of individual keys that collectively comprise the keyboard may be assigned numerical values that form a number or dial pad. As such, the keypad 120 may be provided with, for example, 30 or more keys, including special character keys, space bar, and/or application keys. A designated cluster of the keys may be provided numeric alternative values. For example, keys may be selected to carry numbers "1-9" in three rows and three columns, with "0" being formed as an isolated element in a fourth row. In an implementation shown by FIG. 2B, an alternative keypad 220 may be numeric-centric, so as to include buttons that are primarily part of a dial pad (e.g. 10 keys), but which can have an alternative entry mode for text (e.g. predictive text entry). Numerous alternatives or additions are possible, such as, for example, toggle keyboards.

Slider Housing Constructions

Figure 3A:
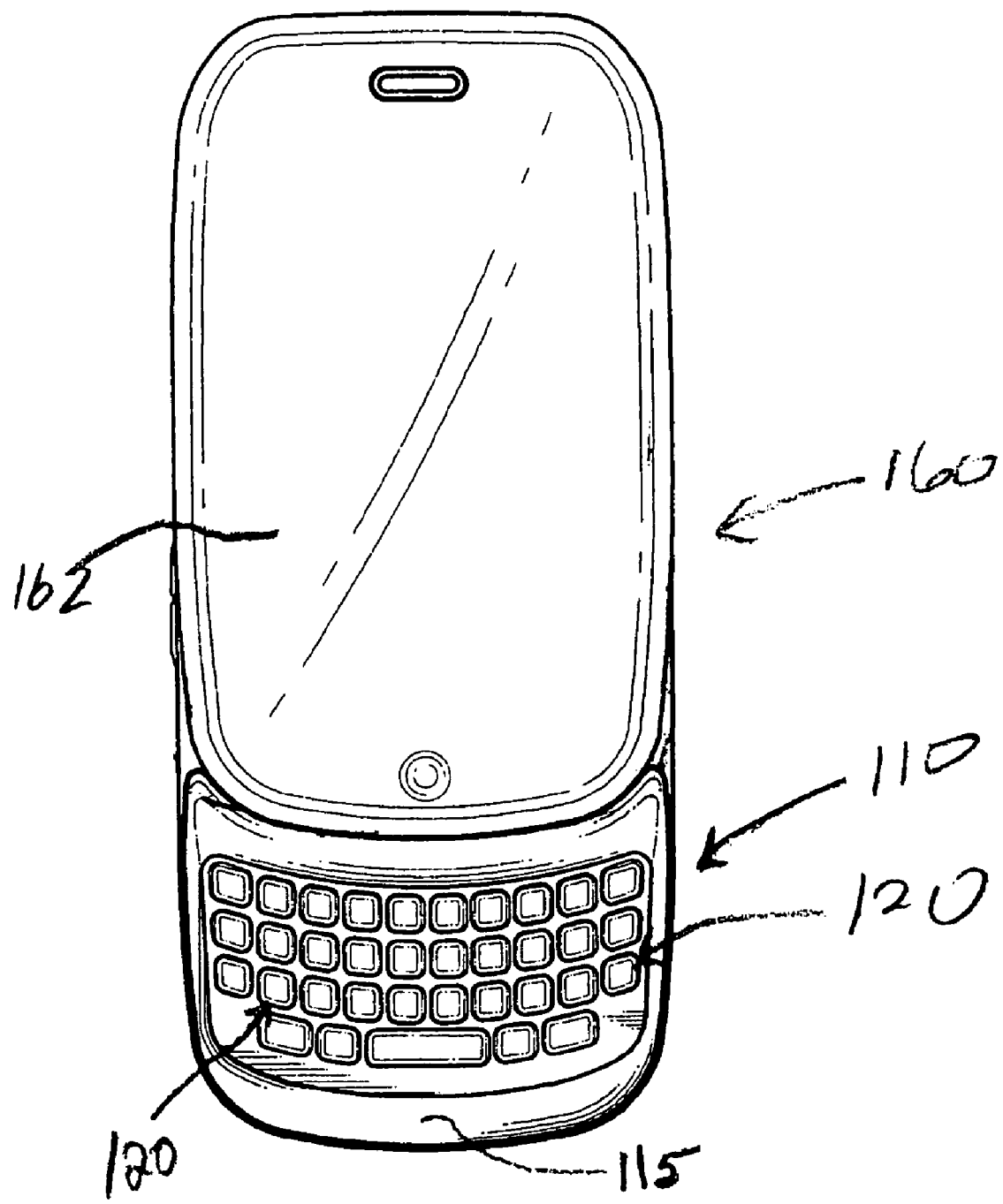
FIG. 3A and FIG. 3B illustrate embodiments in which the housing (FIG. 1) has a slider-housing type construction.
Figure 3B:
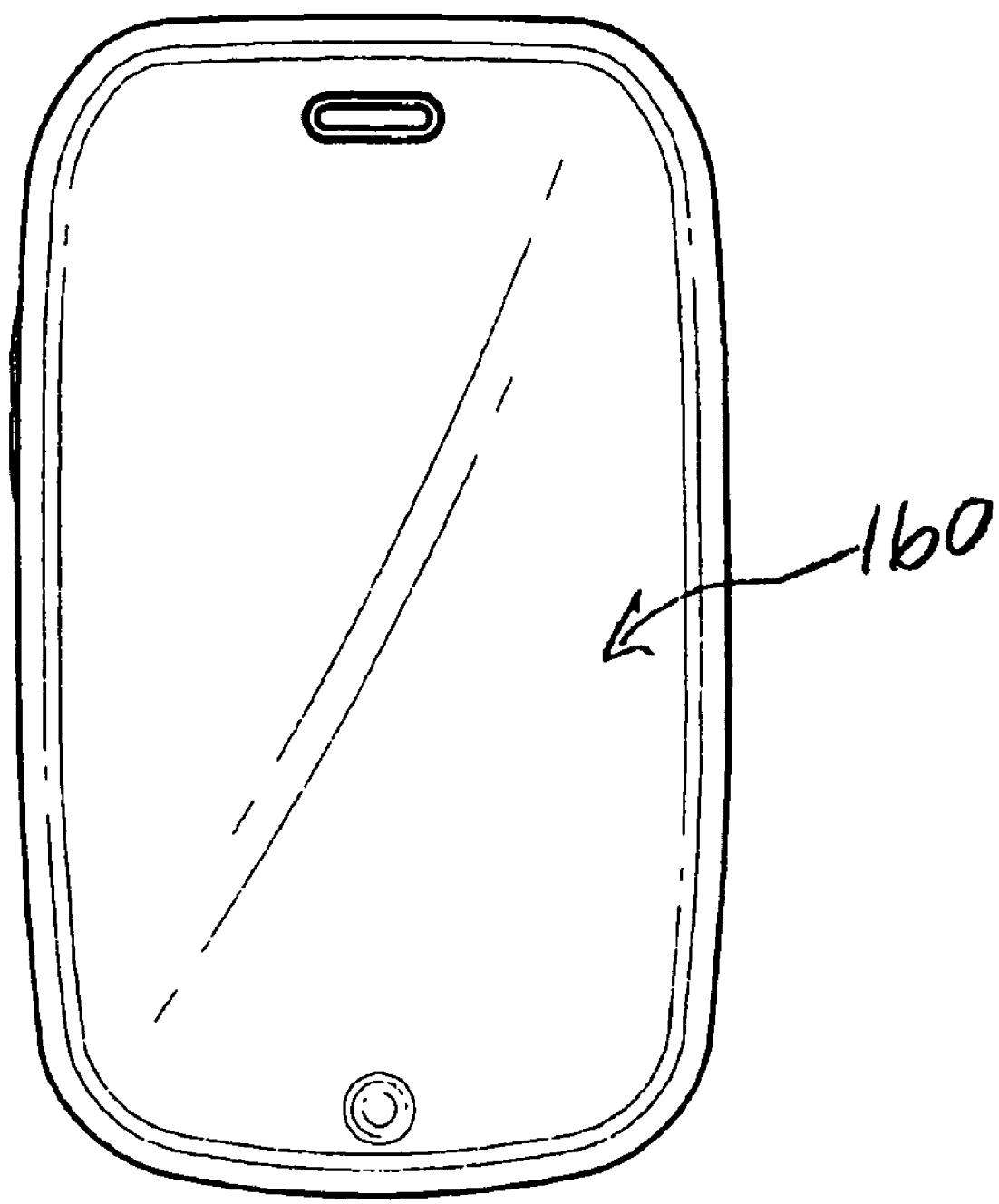

As mentioned, one or more embodiments may be incorporated or embodied in a mobile computing device having separated housing segments. FIG. 3A and FIG. 3B illustrate embodiments in which the housing 102 (FIG. 1) has a slider-housing type construction.

FIG. 3A and FIG. 3B illustrate an embodiment in which the housing 302 of the mobile computing device 310 comprises two housing segments 310, 360 that are moveably coupled to one another to enable a sliding motion between an extended position (FIG. 3A) and a closed position (FIG. 3B). The type of motion may correspond to a linear slide or curvilinear slide, such as described in U.S. patent application Ser. No. 11/971,136, (the aforementioned application being hereby incorporated by reference in its entirety). The second housing segment 360 may thus, for example, move over the first housing segment 330 when the two housing segments are moved from an extended position into a contracted position. The first housing segment 330 and the second housing segment 360 may be coupled to enable the two housing segments to be slid apart from one another, so as to enable the keypad 320 to be exposed. According to an embodiment, the lip construction 335 may reduce or eliminate gap thickness between the first and second housing segments 330, 360 when the two housing segments are slid onto one another. Among other benefits, the lip construction 335 enables the two housing segments, as a combination, in having a curvilinear and/or tightly spaced sliding motion.

According to an embodiment, the individual key structures of the keypad 320 extend outward from the façade 334 and are completely contained in height by the perimeter lip construction 335. As such, a gap distance to accommodate the key structure height between the first and second housing segments 330, 360 is not required. Rather, the lip construction 335 extends from the façade 334 and enables the two housing segments 330, 360 to be tightly spaced apart in the contracted position (see FIG. 3B) without need to accommodate key structure heights.

Cross-Sectional Descriptions

Figure 4A:
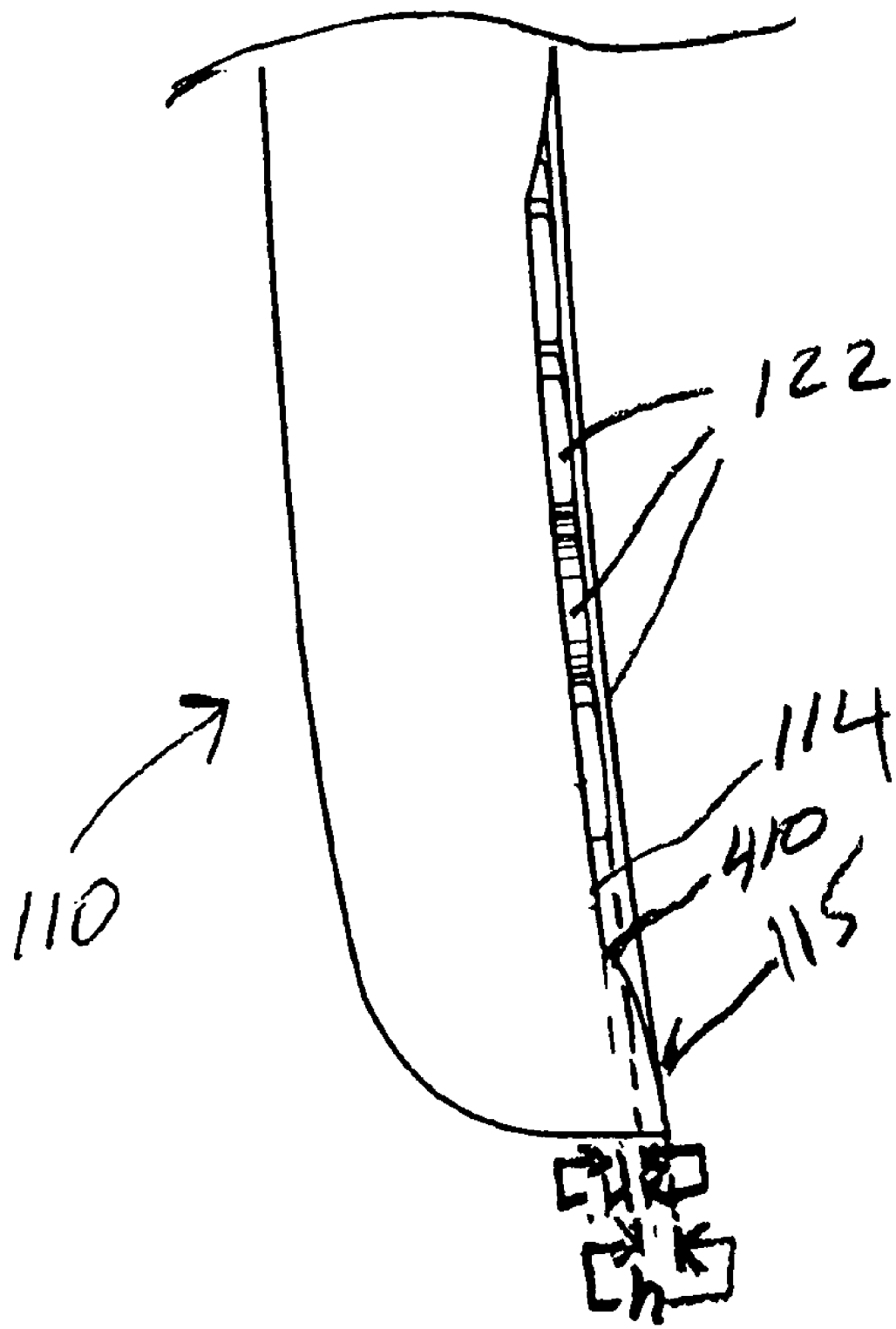
FIG. 4A is a side cross-sectional view of a keypad's housing segment, as seen along lines A-A of FIG. 1, under an embodiment.
Figure 4B:
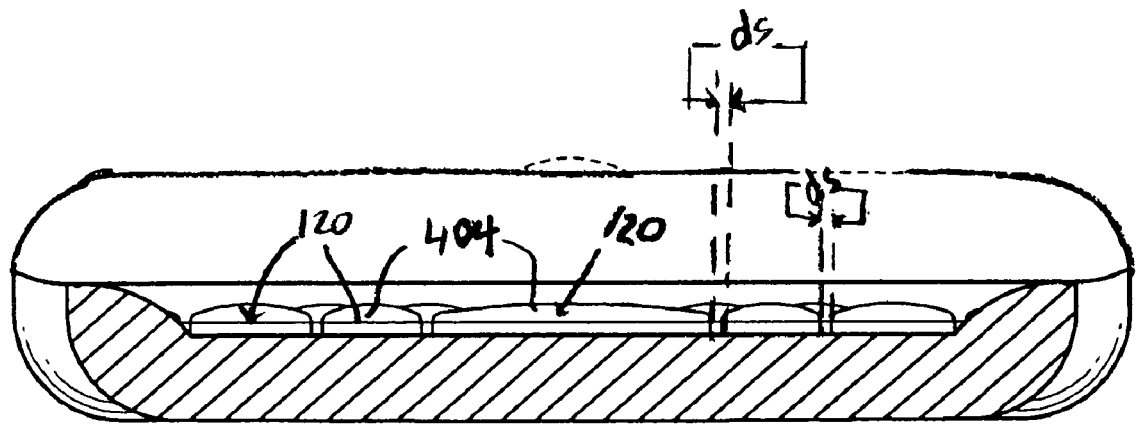
FIG. 4B is a side cross-sectional view of a keypad's housing segment, as seen along lines B-B, under an embodiment.
Figure 4C:
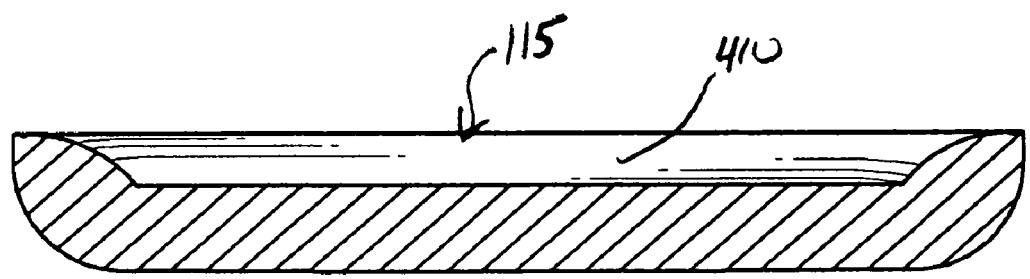
FIG. 4C is a side cross-sectional view of a keypad's housing segment, as seen along lines C-C, under an embodiment.

FIG. 4A through FIG. 4C illustrates various cross-sections of the housing segment 110 shown in FIG. 1, under one or more embodiments of the invention.

FIG. 4A is a side cross-sectional view of a keypad's housing segment, as seen along lines A-A of FIG. 1, under an embodiment. The housing segment 110 provides individual key structures 122 of the keypad 120 to extend from the façade 114. The façade 114 extends and forms into the lip construction 115. In an embodiment such as shown, the façade 114 (providing the surface interior of the lip construction) is substantially planar. In an alternative embodiment, the façade 114 may vary its thickness in the Z-direction (extending into the device), so as have a slight or gradual curve. The curvature may be concave or convex.

In an embodiment, a transition between the façade 114 and the lip construction 115 provides an inner surface 410. Under an embodiment (such as described with FIG. 6), the inner surface 410 serves as both thumb support and landmark. Furthermore, a dimension of the lip construction h, measured as the distance in the Z-axis that separates the tip of the lip construction 115 and the façade 114, is greater than a dimension hk, corresponding to the height of individual keys 120 above the façade 114 (as measured in the Z-direction). Thus, as described with FIG. 3A and FIG. 3B, an embodiment such as shown provides that the keypad 120 is completely contained in height within confines defined by the height h of the lip construction 115.

FIG. 4B is a side cross-sectional view of a keypad's housing segment, as seen along lines B-B, under an embodiment. The keys 122 may form, for example, a QWERTY type keyboard. Each key 122 may include a contact surface 404 that is contacted by the user. The individual keys may be pushed or compressed to actuate an input. For example, as provided in many conventional keypad constructions, the individual keys may be positioned or integrated with plungers that can travel inwards to strike snap-dome electrical contacts. The compression or pushing of individual keys 122 may enable plungers to travel inwards. In one embodiment, the contact surfaces 404 of the individual keys 122 may be contoured or rounded.

In an embodiment, the keys 122 that form keypad 120 (FIG. 1) are tightly spaced to be abutting, or nearly abutting. For example, the spacing distance ds between individual keys 122 may correspond (for at least some keys) to a measurement that is less than 0.8 mm, and even between 0.3-0.5 mm. Such measurements may be less than the tolerance spacing required to, for example, mold individual keys on a carrier, as provided by many conventional approaches. In one embodiment, the keypad configuration (including the spacing between individual keys) is provided by incorporating a modular, pre-assembled keypad as a component in the housing during the manufacturing and/or assembly of the overall housing.

The keys may include contours that promote specific contact points that are spaced from other keys 122. Alternatively, the keys 122 may be flat or flat with concaved contours.

FIG. 4C is a side cross-sectional view of a keypad's housing segment, as seen along lines C-C, under an embodiment. FIG. 4C illustrates the lip construction 115 with an inner surface 410. The inner surface 410 may provide a point of support and/or tactile landmark and reference for when the user operates the keypad 120. The contour provided by the inner support may vary, depending on the implementation. For example, inner surface 410 may have a sharp slope, so as to form a wall. As another implementation, inner surface 410 may be gradual and curvelinear, so as to extend to a peak 412.

Figure 5:
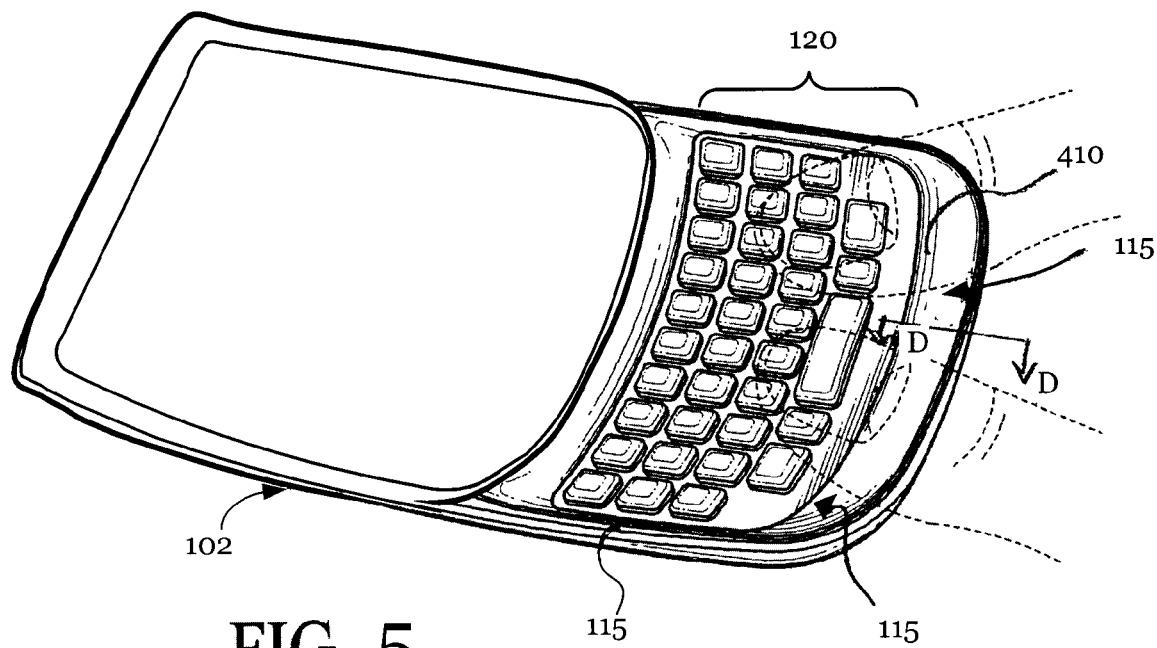
FIG. 5 is a front isometric view of a mobile computing device shown in use, according to an embodiment of the invention.

FIG. 5 is a front isometric view of a mobile computing device shown in use, according to an embodiment of the invention. As shown, the lip construction 115 promotes or facilitates a thumb configuration of the user when using the keypad 120. The thumb configuration may correspond to the user placing the base or bottom sections of the thumbs on a tip of the lip construction 115, and then extend the thumb tips over the keypad 120. FIG. 5 assumes the housing 102 of the mobile computing device has a slider type construction, although similar thumb configurations may be promoted or facilitated for other types of housing constructions (e.g. single-body construction). In particular, an embodiment shown provides that the lip construction 115 provides a stop or rest platform for the user's thumbs. The user may rest a base or portion of one or both thumbs on the inner surface 410 of the lip construction 115, so as to enable a platform support and/or landmark for the user to operate the keypad 120. For example, the inner surface 410 provides an intuitive landmark by which the user may place thumbs for subsequent typing. The inner surface 410 may further enable the user to have some leverage when making thumb movements to type.

Figure 6:
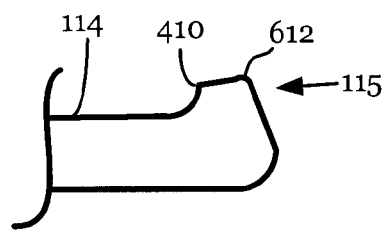
FIG. 6 is an illustrative side view of the lip construction 115, as shown by circle D-D of FIG. 5, according to an embodiment of the invention.

FIG. 6 is an illustrative side view of the lip construction 115, as shown by circle D-D of FIG. 5, according to an embodiment of the invention. In one embodiment, the lip construction may include a sharpened or pointed peak 612, with the inner surface 410 being sloped or contoured. In other implementations, the peak 612 may be tapered, rounded or smoothed. Likewise, the specific contour or slope of the inner surface 410 may be varied.

Figure 7:
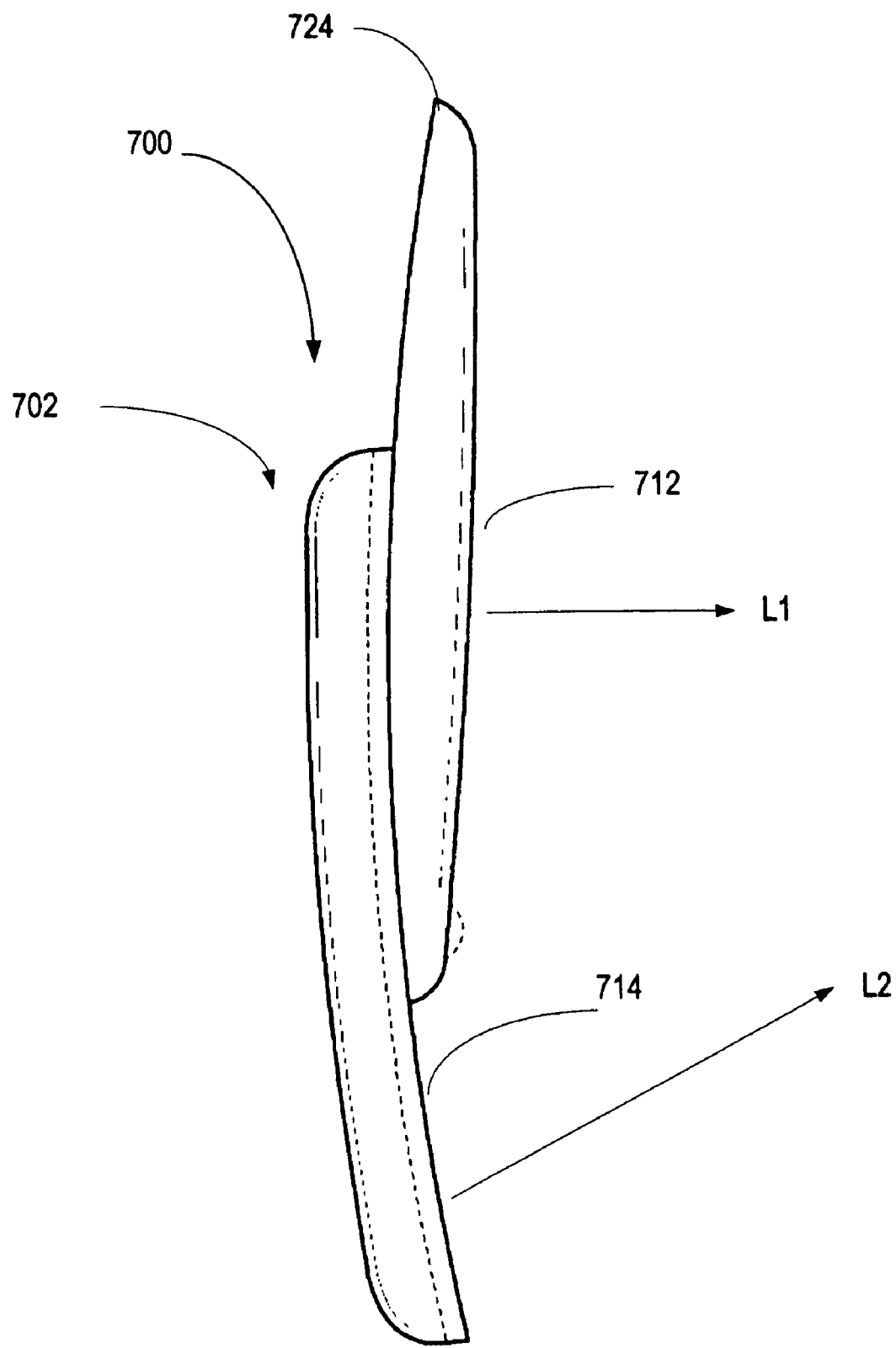
FIG. 7 illustrates a side view of device, according to anyone of the embodiments described herein.

FIG. 7 illustrates a side view of device 700, according to anyone of the embodiments described herein. In one embodiment, device 700 may include a housing 702 having a front housing segment 710 and a back housing segments 760. In one embodiment, the front housing segment 710 and the back housing segment are aligned to orient and tilt the keypad forward to the user while maintaining a display or other primary surface in view of the user's vision. An embodiment shown by FIG. 7 assumes a sliding housing construction, although the orientation being described may apply to other housing construction forms. Accordingly, one embodiment provides that the front and back housing segment 710, 760 are each curved or contoured, so that their motion relative to one another is linear, or alternatively, arced. In such an embodiment, when the housing segments 710, 760 are in the extended position, an embodiment provides that an exterior front face 712 of the second segment 760 is acutely angled with an respect to an orientation of the keypad surface 714. Specifically, an embodiment provides that an orthogonal axis (L1) of the front face 712 is acutely angled with respect to an orthogonal axis (L2) of the keypad surface 714. The orientation may be developed by arcing individual housing segments 710, 760, as well as the coupling between the housing segments. Thus, in use, the front face 712 (which may provide the display surface) may be oriented towards the user's line of sight. At the same time, the keypad surface 714 may be tilted upward for use by the user for when the user holds the device in a normal operating position. In this position, a top end 724 of the front housing segment 760 is leaning forward. Likewise, in the extended position, the housing segment 710 on which the keypad 120 (see FIG. 3A) is provided is also tilted. In such a configuration, a region of the back housing segment on which the keyboard 120 is provided is tipped towards the user when the device is held in an upright position.

Hardware Diagram

Figure 8:
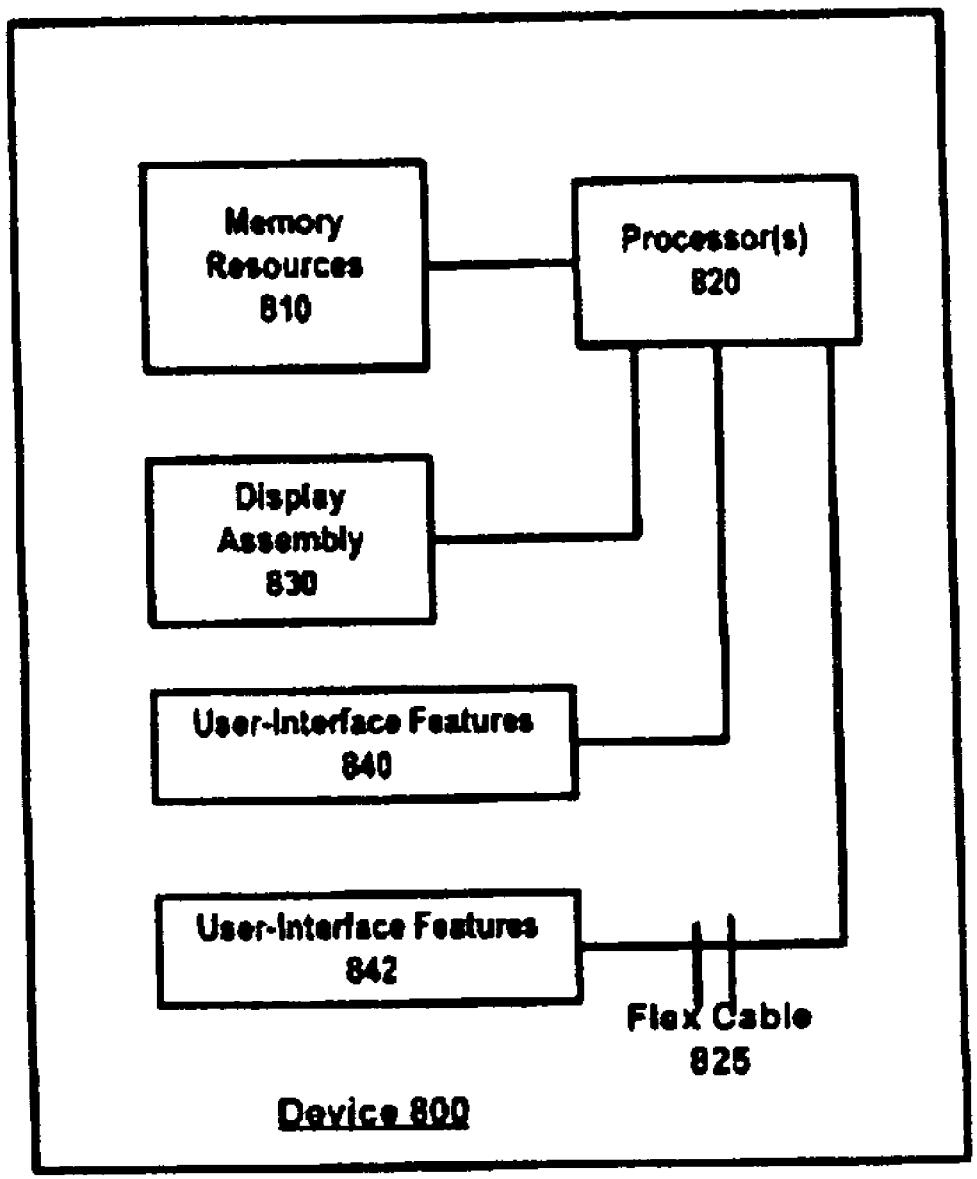
FIG. 8 is a hardware diagram of a device for use with any of the embodiments described herein.

FIG. 8 is a hardware diagram of a device for use with any of the embodiments described herein. Numerous components and functionality may be incorporated for use with the device 800. The components include, for example, processors, memory components, interconnect elements, a printed circuit board, internal elements of a keypad of keyboard, a Liquid Crystal Display (LCD) of a display assembly, speakers or other audio equipment, wireless transmitters for different types of wireless communication mediums (e.g. Wireless Fidelity or WiFi, Bluetooth, WiMax cellular) and numerous other components.

According to an embodiment, the device 800 may correspond to any of the devices illustrated with preceding embodiments. The device 800 may include memory resources 810, one or more processors 820, a display assembly 830, and various user-interface features 840, 842. In one embodiment, at least some of the user-interface features 840, 842 (e.g. keyboard or keypad) may be separated so as to be in a different housing segment from the one or more processors 820. A flex cable 825 may be used to interconnect the separated input/output interfaces 842 from the processors 820 and/or other components. However, in other embodiments, any of the internal components and devices, including one of multiple processors, may be distributed between the two housing segments.

According to an embodiment, the display assembly 830 is provided its own housing segment. The one or more processors are capable of generating or detecting input from soft-interface features that are provided with the display assembly 830. The soft-user interface features may be provided as computer-generated features in connection with operation of the display assembly 830, or alternatively, as fixed features. One or more embodiments provide that the soft-user interface features may operate with touch, contact or light sensors (e.g. capacitive sensors).

Alternative Embodiments

While an embodiment of FIG. 3 makes illustrates a dimension of the mobile computing device 100 and its keypad, embodiments described herein contemplate a wide variety of dimensions. In particular, one or more embodiments may pertain to a miniaturized keypad for an ultra-small form factor computing device. Such a keypad may enable, for example, a 30 button keyset such as shown and described with FIG. 2A, with exception that the keypad and keys are so small to promote one thumb typing or use. In such an embodiment, the lip construction 115 (FIG. 1) may enhance the user's ability to hold and type. For example, the lip construction 115 (FIG. 1) may stabilize the device when the user's holds it with one hand to type or operate. Even with two hands, devices that are miniaturized are inherently difficult to hold, and the lip construction 115 may provide a landmark or reference point from which the user can coordinate the use of both thumbs.

While numerous embodiments described above provide for a device that has housing segments 110, 160 that are slideably coupled to one another (either pure linear or curvilinear), one or more other embodiments provide other combinations or types of housings. For example, in one embodiment, the two housing segments 110, 160 may be pivotally connected, such as in the form of a 'flip phone'. In another embodiment, the device 100 may be of single-body construction. For example, the device 100 may include only one housing segment that has, for example, the lip construction 115. Other features, such as sizing the depth of façade 114 so that the height of the keys 402 (FIG. 4) are contained within the height of the lip construction 115 may also be provided.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A mobile computing device comprising:
   a housing;
   a keypad assembly that provides a plurality of keys on a façade of the housing, wherein the keypad assembly and the plurality of keys are dimensioned to be operable with one or both of a user's thumbs; and
   a housing lip that protrudes from the façade of the housing so as to at least partially circumvent the plurality of keys;
   wherein the housing lip is spaced from at least a portion of a bottom side of the plurality of keys to enable a region of the façade to receive a part of the user's thumb.

2. The mobile computing device of claim 1, wherein the housing lip includes an inward surface that is oriented towards the plurality of keys, and wherein the inward surface is acutely oriented to face the plurality of keys.

3. The mobile computing device of claim 1, wherein the housing lip is spaced from the bottom side and at least a portion of each lateral side of the plurality of keys.

4. The mobile computing device of claim 1, wherein the plurality of keys provide a QWERTY type keyboard.

5. The mobile computing device of claim 1, further comprising a single-body housing, wherein the plurality of keys are provided on a portion of the single-body housing.

6. The mobile computing device of claim 1, further comprising a two-body housing and a display surface, the two-body housing comprising a first housing segment that is slideably coupled to a second housing segment to linearly move between an extended position and a contracted position, and wherein the plurality of keys are provided on the first housing segment, and wherein the display surface is provided on the second housing segment.

7. The mobile computing device of claim 1, further comprising a two-body housing and a display surface, the two-body housing comprising a first housing segment that is pivotally coupled to a second housing segment to pivot between an extended position and a contracted position, and wherein the plurality of keys are provided on the first housing segment, and wherein the display surface is provided on the second housing segment.

8. A mobile computing device comprising:
   a keypad comprising a plurality of keys, the plurality of keys occupying a footprint on the front façade that includes a top border and a bottom border, wherein the keypad and the plurality of keys are dimensioned to be operable with one or both of a user's thumbs;
   a housing segment that includes a façade on which the keypad is provided; and
   a housing lip that (i) protrudes from the façade on which the keypad is provided, and (ii) extends adjacent to at least the bottom border of the footprint, the housing lip providing an inward surface that is contoured and oriented, at least in part, to face the plurality of keys.

9. The mobile computing device of claim 8, wherein the inward surface of at least a portion of the housing lip is acutely oriented to face the keypad area.

10. The mobile computing device of claim 8, wherein the façade on which the keypad is provided is contoured about one or two directions.

11. The mobile computing device of claim 10, wherein the façade on which the keypad is provided has a concave contour.

12. The mobile computing device of claim 8, wherein the housing lip is spaced from at least a portion of the bottom area to enable a region of the front façade to receive a part of the user's thumb.

13. The mobile computing device of claim 8, wherein the housing lip extends around the bottom side of the keypad and around at least a portion of each lateral side of the keypad area.

14. The mobile computing device of claim 8, wherein the plurality of keys provide a QWERTY type keyboard.

15. The mobile computing device of claim 14, wherein at least some of the plurality of keys that form the keyboard also provide a number pad.

16. The mobile computing device of claim 8, further comprising a single-body housing, wherein the keypad area and the façade are provided on a portion of the single-body housing.

17. The mobile computing device of claim 8, further comprising a two-body housing and a display surface, the two-body housing comprising a first housing segment that is slideably coupled to a second housing segment to linearly move between an extended position and a contracted position, and wherein the keypad area and façade are provided on the first housing segment, and wherein the display surface is provided on the second housing segment.

18. The mobile computing device of claim 8, further comprising a two-body housing and a display surface, the two-body housing comprising a first housing segment that is pivotably coupled to a second housing segment to pivot between an extended position and a contracted position, and wherein the keypad area and façade are provided on the first housing segment, and wherein the display surface is provided on the second housing segment.

19. A housing segment for a mobile computing device, the housing segment comprising:
    a keypad comprising a plurality of keys, the plurality of keys occupying a footprint on a front façade that includes a top border and a bottom border, wherein the keypad and the plurality of keys are dimensioned to be operable with one or both of a user's thumbs;
    a façade of the housing segment on which the keypad is provided; and
    a housing lip that (i) protrudes from the façade of the housing segment, and (ii) extends adjacent to at least the bottom border of the footprint, the housing lip providing an inward surface that is contoured and oriented at least in part to face the plurality of keys.

\* \* \* \* \*